United States Patent [19]

Lewiner et al.

[11] 4,285,022
[45] Aug. 18, 1981

[54] DEVICES ADAPTED TO DETECT VARIATIONS IN MAGNETIC FLUX NOTABLY CIRCUIT BREAKERS

[76] Inventors: Jacques Lewiner, 4, rue Bory d'Arnex, 92210 Saint-Cloud; Gérard Dreyfus, Rue du Viaduc, Villebon Sur Yvette, 91120 Palaiseau; Didier Perino, 10, rue de Bellevue, 92150 Súresnes, all of France

[21] Appl. No.: 58,261

[22] Filed: Jul. 17, 1979

[30] Foreign Application Priority Data

Jul. 25, 1978 [FR] France .............................. 78 22016

[51] Int. Cl.³ .............................................. H02H 3/33
[52] U.S. Cl. ....................................... 361/45; 361/93
[58] Field of Search ...................... 361/45, 44, 46, 42, 361/43; 335/153, 174; 200/181

[56] References Cited

U.S. PATENT DOCUMENTS

| 2,885,511 | 5/1959 | Diesel .................................. 200/181 |
| 3,123,742 | 3/1964 | Moser et al. ....................... 361/45 X |
| 3,599,043 | 8/1971 | Biedermann ....................... 361/45 |
| 3,813,579 | 5/1974 | Doyle et al. ....................... 361/46 |
| 3,857,096 | 12/1974 | Gregory ............................. 361/45 X |
| 4,015,169 | 3/1977 | Misencik ............................ 361/45 |

FOREIGN PATENT DOCUMENTS

601771 3/1978 U.S.S.R. ................................... 200/181

*Primary Examiner*—Patrick R. Salce

*Attorney, Agent, or Firm*—Larson and Taylor

[57] ABSTRACT

The device detects variations in magnetic flux so that the passage through a given threshold by the amplitude of such a variation per unit time is manifested by the movement of an element adapted to trigger an action. It comprises a practically closed electrical circuit, such as a winding, arranged and mounted so that the variation in magnetic flux to be detected generates by induction at the terminals of this winding an electrical voltage V, two electrodes forming a capacitor, one of which is movable with respect to the other, an electret interposed between these two electrodes and whose charge produces a field exerting on these electrodes an electrostatic force H tending to bring them mutually together, means for forming a rectified voltage U from said voltage V and for applying this voltage U between the two electrodes in a direction such that the field which results therefrom is opposite that generated by the electret and hence tends to reduce the force H, and means urging the movable electrode scarcely reversibly in the opposite direction to the force H. The force G of these urging means and the charge of the electret are selected so that the overshoots by the voltage U of a predetermined threshold $U_o$ corresponding to the level to be detected of the magnetic flux-generating phenomenon cause swings of the movable electrode from its vigilance position to its active position, the triggering of said action being servocoupled to said swings.

15 Claims, 5 Drawing Figures

DEVICES ADAPTED TO DETECT VARIATIONS IN MAGNETIC FLUX NOTABLY CIRCUIT BREAKERS

BACKGROUND OF THE INVENTION

The invention relates to devices adapted to detect magnetic flux variations so that passage through a given threshold by the amplitude of such a variation per unit time is manifested by the movement of an element adapted to trigger an action such as a signal, an alarm or a safety operation, this element being notably the movable contact of an electrical switch.

It relates more particularly, among such devices, to those which comprise an almost closed electric circuit which can be influenced by the flux variation to be detected and adapted to convert the latter into an induced electromotive force.

If the flux variation concerned is produced by a single and non-repetitive phenomenon, such as, for example, the translation of a magnet or the sudden variation of a direct current, the value of the induced electromotive force is directly proportional to the amplitude of the phenomenon to be detected.

However, if the phenomenon to be detected is an alternating current of frequency f, and then the flux concerned is a sinusoidal flux of the form $\Phi = \Phi_o \sin 2\pi ft$ generated along the axis of a winding by circulation of said alternating current in this winding, the inductive electromotive force which is generated, at the terminals of another winding traversed by the same flux, by the variation of this flux in time, is of the form $d\Phi/dt = 2\pi f \Phi_o \cos 2\pi ft$: the average value of this electromotive force is zero, but not that of the corresponding rectified voltage, which value is proportional to the product $2\pi f \Phi_o$.

It is such a value which is exploited according to the invention, but in general the rectification concerned is only useful to give a certain direction to the elaborated signal, since this signal is elaborated from the first alternation of the alternating phenomenon to be detected, this first alternation bringing into play by itself a flux variation sufficiently rapid and intense for detection.

Among the devices of the type concerned, the invention relates among others to circuit breakers or safety equipment mounted in the supply of an electrical circuit and designed to cut automatically or "cut-off" this supply from the appearance of a leakage current and/or of an overintensity at any point of said circuit.

It is aimed notably, among such circuit breakers, at those comprising a transformer mounted in the supply leads of the circuit to be protected, which transformer is arranged so as to generate automatically in another lead a variable voltage V when a current unbalance occurs in the first leads and means for exploiting said voltage V so as to cut automatically one at least of said first leads as soon as the amplitude of said voltage exceeds a predetermined threshold.

Such circuit breakers are particularly advantageous for the detection of a leakage current corresponding to a portion of a supply current, which portion, coming from the source to the level of the receiver by following one of the two leads of a supply cord, returns to ground and not to the second lead of said cord through a human body placed involuntarily in contact with a bare conductive portion of the circuit concerned, which creates a particularly serious risk of electrocution in a moist environment.

It is a particular object of the invention to render devices of the type concerned such that they respond better to the various exigencies of practice than hitherto, notably so that their operation is certain and autonomous, that is to say does not necessitate any source of external power for their operation and does not consume any electrical current in the surveillance or vigilant state, and so that they are easy to reset after use.

GENERAL DESCRIPTION OF THE INVENTION

Detection devices of the kind concerned according to the invention are of the type comprising an almost closed electrical circuit, such as a winding, arranged and mounted so that the variations of the magnetic flux to be detected generate by induction at the terminals of this winding an electrical voltage V, and they are characterized in that they comprise in addition two electrodes forming a capacitor, of which one is movable with respect to the other, an electret, interposed between these two electrodes, of which the charge produces a field exerting on these electrodes an electrostatic force H tending to bring them mutually together, means for forming from the above voltage V a rectified voltage U and to apply it between the two electrodes in a direction such that the field which results therefrom is opposed to that generated by the electret and hence tends to reduce the force H, and means urging "scarcely reversibly" the movable electrode in the direction opposite to the force H, the urging force of these means and the charge of the electret being selected so that the overshoots by the voltage U of a predetermined threshold $U_o$ corresponding to the level to be detected of the phenomenon generating the magnetic flux cause swings of the movable electrode from its surveillance position to its active position, the triggering of the action desired being servo-coupled to said swings.

In preferred embodiments, recourse is had to one and/or other of the following features:

the urging means with scarcely reversible action are of the magnetic type and constituted preferably by a fixed permanent magnet and by a part of magnetic material connected to the movable electrode, the urging means with scarcely reversible action are constituted by an elastic mechanism with dead center overshoot, a manual resetting member is provided to replace the movable electrode in its initial resting position after its swings, the detector device comprises, mounted on one of the leads connecting the output from the rectifying means to the capacitor, a voltage limiter adapted to cut-off this lead when the voltage U remains lower than the threshold $U_o$ and a high resistor connected between the two electrodes of the capacitor, the detector device is a circuit breaker sensitive to unbalances of an electrical supply provided through first leads, and it comprises a transformer arranged so as to generate a voltage automatically in another lead on the appearance of such an unbalance in said supply, said voltage playing the role of the above voltage V, and an electrical switch mounted on one at least of said first leads and arranged so as to be opened by the abovesaid swings of the movable electrode, the circuit breaker according to the previous paragraph is immaterially sensitive to a leakage current adapted to unbalance an electrical supply provided through at least two leads, or to an over-intensity appearing in one of these leads, and it comprises to this end two sub-assemblies upstream with a transformer and rectifier each sensitive to one of these faults and selected so as to form respectively control signals of the same order of magnitude, and a common downstream sub-assembly comprising the electret capacitor, the scarcely reversible return means and the switch, in a circuit breaker according to one at least of the two preceding paragraphs, the assembly of the transformer, the rectifying means of the voltage V, the electrodes, the electret, the urging means with scarcely reversible action and the switch are mounted in the same casing, the casing according to the preceding paragraph is that of an electrical plug with at least two male or female pins, the casing according to the paragraph before last is a connector for an electrical plug comprising at least two male pins and at least two female pins.

The invention comprises, apart from these main features, certain other features which are preferably employed at the same time and which will be more explicitly considered below.

BRIEF DESCRIPTION OF THE DRAWINGS

In the following, some preferred embodiments of the invention will be described with reference to the accompanying drawings, which description and drawings are of course given purely by way of non-limiting illustration.

DESCRIPTION OF PREFERRED EMBODIMENTS

Figure 1:
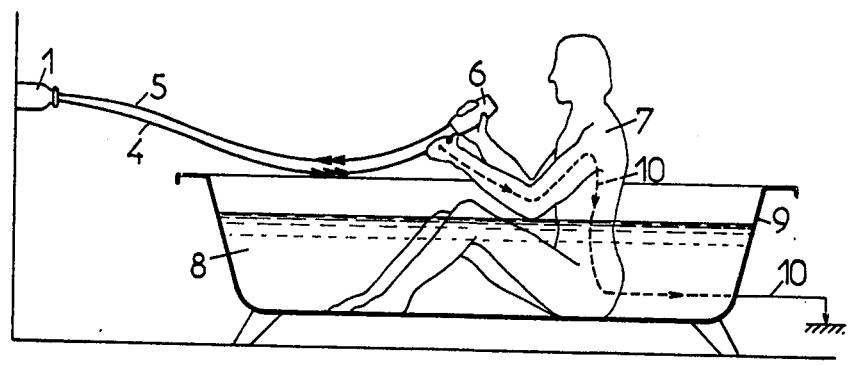
FIG. 1 of these drawings shows one use of an embodiment of a circuit breaker according to the invention.
Figure 2:
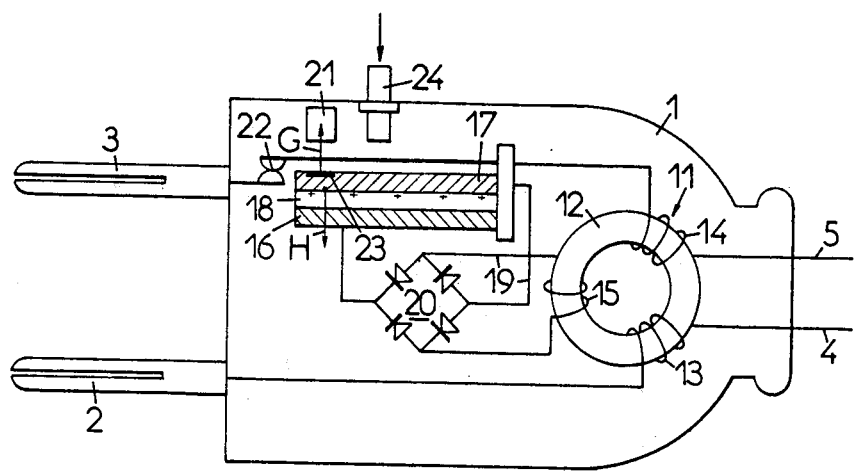
FIG. 2 shows such a circuit breaker, diagrammatically.

The circuit breaker shown in FIGS. 1 and 2 is contained in the casing 1 of an electrical plug with two male pins 2 and 3 connected electrically, through respectively two conductive leads 4 and 5, to an electrical apparatus 6.

This apparatus 6 is designed to be used in an environment where risk of electrocution exists, notably in a bathroom, a kitchen, a workshop or the like.

It may be, for example, one of the following electrical apparatuses: hair dryer, razor, toothbrush, massage apparatus, smoothing iron, beater, vegetable press, coffee maker, drill, etc.

It is known in particular, that if the human body has in the dry state a relatively high resistance, of the order of 100 kilohms, this resistance is considerably reduced when it is wet, possibly dropping then to only some hundreds of ohms.

If therefore an individual in this wet condition comes into contact with the bared conductive area of an electrical circuit under voltage, the portion of the current passing through this circuit, which can pass through his body to return to ground can be relatively intense and there may be a considerable danger of electrocution.

In FIG. 1, by the reference numeral 7 is denoted the body of such a person partly immersed in water 8 of a bath 9, and whose left hand comes into contact with a bared area of one of the wires 4 and 5: the arrowed path 10 denotes the course of the leakage current which is then created through the body 7 and the pipes serving the bath 9 to ground, only a portion of this supply current which has come from the source to the point of use through the wire 4 (phase) returning to this source through the wire 5 (neutral).

The circuit breaker according to the invention is arranged so as to cut-off immediately one at least of the two wires 4 and 5 at the level of the plug 1 on the creation of such a leakage current.

It comprises:

a differential transformer 11 (FIG. 2), composed of three windings mounted on the same closed magnetic core 12, such as a ring of $\mu$-metal, namely two identical windings 13 and 14 constituted respectively by sections of two wires 4 and 5, and a third winding 15, a capacitor composed of a fixed electrode 16 and a movable electrode 17, with the interposition of an electret 18, that is to say of a dielectric sheet charged electrically, secured to the fixed electrode 16, the charges of this electret, producing a field which exerts on the movable electrode 17 an electrostatic attractive force H tending to flatten it against the electret, an electrical circuit 19 with a rectifying bridge 20, adapted to apply to the electrodes 16 and 17 a voltage U created by rectification of the voltage V possibly collected at the terminals of the winding 15, and this in a direction such that the field which results therefrom is opposed to that created by the electret and hence tends to reduce the force H, a member 21 adapted to exert on the movable electrode, in "scarcely reversible" manner, this term having the meaning indicated below, another attractive force G of direction opposite the force H, that is to say tending to mutually separate the two electrodes, and a switch 22 interposed in one at least of the two wires 4 and 5 so that it is closed as long as the movable electrode is flattened against the fixed electrode and on the contrary opened for the other stable position of this movable electrode, spaced from the fixed electrode.

The charge of the electret 18 and the force of the member 21 with scarcely reversible action are selected so that the swings of the movable electrode 17 from its vigilant (monitoring) or rest position (shown in FIG. 2) for which the switch 22 remains closed, to its active position for which it opens the switch 22 are ensured as soon as the value of the voltage U exceeds a predetermined threshold $U_o$.

The value of this threshold $U_o$ is selected to correspond with the maximum current $I_o$ tolerable for the leakage current defined above.

As long as no leakage current exists in the circuits to be protected, the intensities of the forward and return currents which flow respectively in the two windings 13 and 14 of the differential transformer 11 are identical and the differential voltage V then drawn from the terminals of the winding 15 is zero.

The creation of a leakage current is manifested by disequilibrium or unbalance between these two currents and hence by the appearance of an electromagnetic inductive flux in the core 12, which generates in its turn a non-zero induced voltage V at the terminals of the winding 15; it is to the value $V_o$ of this voltage V corresponding to a leakage current having the maximum tolerable intensity $I_o$ that the above-mentioned threshold value $U_o$ for the rectified voltage U, corresponds.

When the threshold $U_o$ is reached by this voltage U, the electrostatic force H exerted on the movable electrode 17 and resulting from the opposing fields due respectively to this voltage U and to the charges of the electret becomes less than the magnetic force G and this electrode swings over, which opens the switch 22.

In other words the operation of the circuit breaker above is automatically triggered as soon as a dangerous leakage current is created in the circuit to be protected.

If the rectifying bridge 20 is a full wave rectifier and if the voltage V is an alternating voltage with a frequency of 50 cycles, the response time of the circuit breaker is less than 100th of a second.

Instead of being single pole and cutting or interrupting only one of the two leads 4 and 5, the switch 22 could be made double pole and cut these two leads simultaneously.

The electret 5 is advantageously constituted by a thin sheet of a polymer based on a fluorinated polymer or a substituted polyolefine of thickness comprised between 1 micron and 1 cm.

Its surface charge density may be comprised between $10^{-12}$ Cb/cm$^2$ and $10^{-4}$ Cb/cm$^2$.

By "scarcely reversible" effect qualifying the mode of operation of the member 21 is meant here an effect of the "avalanche" type, that is to say that it is amplified after its initiation, suppressing from that moment onwards any hesitation.

This member 21 is hence not constituted by a simple mechanical return spring.

In the preferred embodiments, said member 21 is constituted by a fixed permanent magnet adapted to close its magnetic circuit inside an armature 23 of magnetic material forming part of the movable electrode 17 or inserted on the latter.

It is known in fact, that the magnetic attraction exerted by the magnet 21 on the armature 23 is inversely proportional to the square of the distance between these two elements: for this reason, said magnetic traction is relatively weak as long as the movable electrode 17 is applied against the electret 18, which ensures good stability of the whole in the surveillance condition, notably with respect to impacts.

On the other hand, as soon as the movable electrode 17 starts to move away from the electret 18, the separating force increases rapidly, which ensures free actuation of the device.

Finally, the magnetic attractive force between the magnet and the movable electrode becomes a maximum at the end of stroke of the latter, which ensures firm maintenance of the latter in its end-of-stroke position as well as of the switch 22 in its open position.

It is pointed out that this sudden swinging action of the movable electrode 17 is facilitated by the fact that the electrostatic attractions exerted between this movable electrode and both the electret 18 and the fixed electrode 16 are also inversely proportional to the square of the distance between said movable electrode and the two said fixed elements.

The "scarcely reversible" effect defined above can be obtained in other ways.

For example, the attracting member 21 could be constituted by a dead center overshoot elastic mechanism coupled to the movable electrode 17.

On account of the "scarcely reversible" nature of the member 21, it is not sufficient for the leakage current which has caused the swing of the movable electrode 17, and hence the cut-off of one at least of the two leads 4 and 5, to be cancelled for the circuit breaker to return automatically to its initial surveillance state.

It must be reset for this purpose.

By the arrowed push-button 24 there is shown diagrammatically in FIG. 2 such a resetting system, which can be very simply actuated by simple pressure of a finger on a button arranged facing the movable electrode or by an electromagnetic control.

However, the resetting concerned could be produced by other than mechanical means, for example by temporarily applying to the terminals of the electrodes 16 and 17 a DC voltage of sufficient amplitude and opposite direction to the above voltage U.

In the cases where the magnet 21 and the armature 23 are provided, said resetting can also be ensured by inserting a magnetic wedge between this magnet and this armature, so as to close the corresponding magnetic circuit by short-circuit, or, better still, by applying to the whole of the circuit breaker an external magnetic field opposite in direction to that exerted on the armature 23 by the magnet 21 and of sufficient intensity.

The latter modification is particularly advantageous when the group of components of the circuit breaker is enclosed in a common casing such as the housing 1 above.

It is to be noted that it may also be opportune to enclose certain of these components, comprising at least the electrodes 16 and 17, the electret 18 and the switch 22 within a hermetic container, either evacuated, or filled with a neutral gas possibly under pressure.

Of course, the above circuit breaker could be mounted in a housing other than that of a free plug connector with male pins, for example in a fixed socket connector with female pins installed in a bath-room or a kitchen, or again in the housing itself of a portable electrical device whose use it is desired to render non-dangerous.

In a particularly advantageous embodiment, the circuit breaker is mounted in an independent housing forming a connector and itself including for this purpose two male pins and two female pins, this connector being connectable separately in a fixed outlet and able to receive in its turn a portable electric plug associated with one of the above electrical devices.

Figure 3:
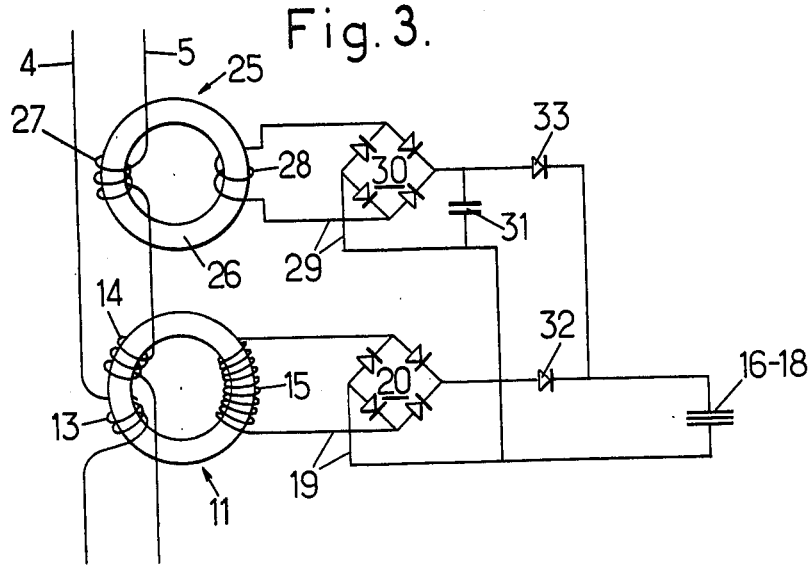
FIG. 3 is the electrical diagram of a portion of another embodiment of such a circuit breaker.

In the embodiment which has been shown diagrammatically in FIG. 3, the circuit breaker is again sensitive to the appearance of a leakage current on one of the two leads 4 and 5, which appearance is detected as previously by the creation of a voltage induced in the winding 15, and then by its rectification by means of the bridge 20 and by its application to the terminals of the capacitor 16, 17 with the electret 18.

However it differs from the preceding one in that it is sensitive also to the appearance of an over-intensity in one of the two leads 4 and 5.

To this end, the circuit breaker concerned comprises a second transformer 25 composed of two windings mounted on the same closed magnetic core 26 such as a ring of $\mu$-metal, namely a first winding 27 constituted by a section of wire 5 (or 4) and a second winding 28.

This latter winding 28 is connected, like the previous winding 15, through a circuit 29 comprising a rectifying bridge 30, to the terminals 16 and 17 of the capacitor.

Of course, if the primary windings of the two transformers 11 and 25 have numbers of turns which are equal or at least of the same order of magnitude, the number of turns of the secondary winding 28 is given a much smaller value than that of the secondary winding 15 in order that the voltage signals applied to the capacitor and corresponding to the triggering of the latter may be substantially identical, whatever the fault, (leakage current or excessive current) which gives rise to them. By way of example, it is indicated that the first channel must ensure triggering for leakage currents of the order of only some milliamperes whereas the excess currents detectable by the second channel are rather of the order of some amperes.

It is also seen from FIG. 3 that there is a capacitor shunted across the output terminals of the rectifying bridge 30 and two rectifiers 32 and 33 connected in series respectively with the two bridges 20 and 30, which elements enable a time delay to be inserted in the tripping of the device of the order notably of some microseconds and thus to avoid these trippings being due to the simple appearance of ephemeral interference in the supply, in particular as regards the detection of excessive currents.

Figure 4:
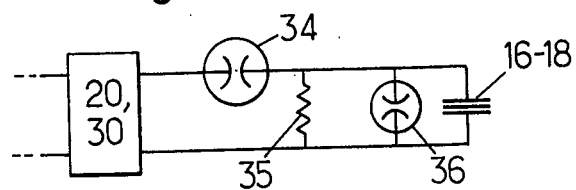
FIG. 4 shows the circuit diagram of an improvement in these various circuit breakers.

In FIG. 4, there is shown diagrammatically an improvement consisting of providing, in the assemblies described above:

on the one hand, a locking member 34 (spark gap, Zener diode, . . .) inserted between one of the terminals of the rectifying bridge (20 or 30) and one of the electrodes 16 and 17 of the capacitor, the resistance of which member preserves a high value Z as long as the voltage U applied at its input remains less than $U_o$, and is lowered on the contrary to a relatively low value z from the passage through this value $U_o$ by the voltage U, and on the other hand, a resistor 35 of a value comprised between z and Z (for example 100 megohms if z and Z equal respectively 10 and 1000 megohms) connected to the terminals of this capacitor 16, 17.

This improvement enables the inadvertent tripping of the device to be avoided for values of the voltage U formed by the bridge concerned which would only be slightly less than the pre-regulated tripping threshold $U_o$: simple shocks could, in fact, suffice for this tripping, in the absence of the elements 34 and 35 above.

On the contrary, the presence of these elements renders impossible the application to the terminals of the capacitor of any voltage of value less than $U_o$.

There is also, advantageously provided, branched between these terminals 16 and 17, another member 36 for protection against over-voltages such as a spark gap, a Zener diode, a gas discharge tube or the like; this member, being rendered conductive as soon as the voltage at its terminals exceeds a predetermined threshold avoids the application of such a voltage to the electret capacitor from damaging the latter.

As a result of which and whatever the embodiment adopted, a circuit breaker is provided whose constitution and operation are clear from the foregoing.

These circuit breakers have a certain number of advantages with respect to those previously known. In particular, they are not then arranged so as to consume any electrical current, even in their surveillance state, they are particularly easy to reset, after tripping, without necessitating the replacement of any part such as a fuse, their operation is particularly safe considering that the positions of their movable electrodes corresponding respectively to the two states of surveillance and of cut-off are remarkably stable and insensitive to shocks: the latter advantage is particularly valuable when the circuit breakers concerned are mounted in portable housings.

As is self-evident, and as emerges already from the foregoing, the invention is not limited in any way to those of its types of application and embodiments which have been more especially contemplated; it encompasses, on the contrary, all modifications, notably:

those where the electret 18 would be borne not by the fixed electrode 16, but by the movable electrode 17, said movable electrode being producible by simple metallization of said electret, those where the swings of the movable electrode would be exploited so as to trip, instead of or in addition to the simple opening of one or of several electrical switches, another action, notably the closing of such switches for alarm purposes, or again the deflection or masking of a light beam, or even the closing or opening of a fluid passage orifice, those where insulating spacing shims would be inserted between the electret and the facing electrode to which it is not fast, so as to reduce the risks of accidental discharge of the electret and thus to increase the lifespan thereof, those where the electrical supply of which it is desired to watch for faults would be ensured by a number of leads greater than 2, for example, equal to 3, the transformer intended to detect a possible unbalance of such a supply, then with three phases, being then arranged so as to generate a voltage in its secondary equal at any moment to the algebraic sum of its three phases.

Figure 5:
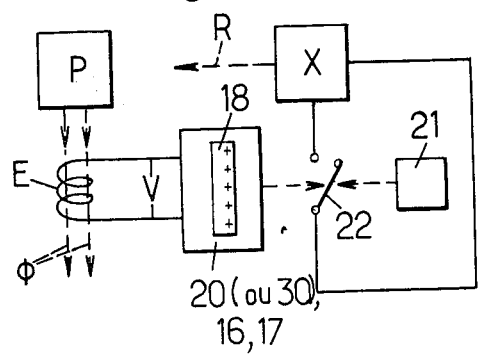
FIG. 5 is a general schematic circuit diagram of the invention.

More generally also, it is possible to consider that the invention encompasses all cases, shown diagrammatically in FIG. 5, where it is desired to detect the overshoots of a given threshold by the rate of change of a phenomenon P (FIG. 5) - and in particular by the sufficiently rapid appearance of such a phenomenon -, the change concerned being suitable to be manifested itself by a variable magnetic flux $\Phi$, instantaneously generating in a winding E (of the type notably of windings 15 and 28 above) an induced electromotive force V, this electromotive force being then converted into a voltage U by rectification (at 20 and/or 30), then applied to a capacitor 16, 17 with an electret 18, so as to cause one of the electrodes of this capacitor to swing over, itself urged by a magnet 21 or the like, the swings concerned being then exploited for any desirable purpose, notably by the actuation of an electrical switch 22.

The means utilized for this exploitation, which are shown diagrammatically in FIG. 5 by the block X, are advantageously arranged so as to react on the phenomenon P, as as been shown diagrammatically by the arrow R, so as at least to neutralize the possible dangerous effects capable of being caused by this phenomenon when its manifestation exceeds a certain magnitude.

As examples of such phenomenon P other than the appearance of leakage currents or excessive currents capable of resulting in a cut-off, may be mentioned as encompassed by the invention, any other phenomena capable of causing the magnetic field or flux passing through the winding E above to vary and for which it is advantageous to detect the overshoot of a given threshold by said variation by means of a detector responding to the following conditions: this detector, in spite of its "autonomous" character, that is to say of which the surveillance and operation does not call upon any external current source, and in spite of its small dimensions—lending itself to miniaturization-, converts even relatively small and rapid variations of the detected flux into free and irreversible swings of a movable element, which swings are characterized both by large amplitude, which permits the direct actuation of power circuits, and by a high sustaining force in the swung-over position, which requires special resetting and confers a high degree of safety on the controls ensured. Such other phenomena are for example, the movements of an object connected either to a magnet close to the winding E, or to a magnetic shield arranged at least in part between this winding E and a magnet close to the latter: such an object could, for example, be a float, which permits the detection of a level through a fluid-tight and magnetic wall.

We claim:

1. Device for detecting variations in magnetic flux so that the passage through a given threshold by the amplitude of such a variation per unit time is manifested by the movement of an element adapted to trigger an action, said device comprising a winding arranged and mounted so that the variation in magnetic flux to be detected generates by induction at the terminals of said winding an electrical voltage V, said device comprising in addition two electrodes forming a capacitor, one of which electrodes is movable with respect to the other, an electret interposed between these two electrodes and whose charge produces a field providing an electrostatic force H on said electrodes tending to bring them mutually together, means for forming a rectified voltage U from said voltage V and for applying this voltage U between the two electrodes in a direction such that the field which results therefrom is opposite that generated by the electret and hence tends to reduce the force H, and means for urging the movable electrode, in a manner which is not reversible without the application of a countervailing external force, with a force G in the opposite direction to the force H, the force G of said urging means and the charge of the electret being selected so that when the voltage U exceeds a predetermined threshold $U_o$ corresponding to the level to be detected the movable electrode is caused to move from an initial rest position to an active position, the triggering of said action being responsive to such movement of the movable electrode.

2. Detector device according to claim 1, wherein the urging means is of the magnetic type.

3. Detector device according to claim 2, wherein said magnetic type urging means are constituted by a fixed permanent magnet and by a part of magnetic material connected to the movable electrode.

4. Detector device according to claim 1, wherein the urging means is constituted by a dead center overshoot elastic mechanism.

5. Detector device according to claim 1, wherein a manual reset member is provided for replacing the movable electrode in its initial rest position after movement of the movable electrode to the active position.

6. Detector device according to claim 1, comprising, mounted between the rectifier means and the capacitor, a locking assembly for automatically interrupting the connection between said rectifier means and said capacitor as long as the voltage U remains below the threshold $U_o$ and for establishing this connection when the voltage U exceeds said threshold.

7. Detector device according to claim 1, wherein an overvoltage protection member is connected to the terminals of the capacitor.

8. Circuit breaker according to claim 1, sensitive to the unbalance of an electrical supply effected through first leads, comprising a transformer arranged so as to generate automatically a voltage in another lead on the appearance of such unbalance in said supply, and an electrical switch mounted on one at least of said first leads and arranged to be opened by said swings of the movable electrode.

9. Circuit breaker according to claim 8, which is at least sensitive to a leakage current adapted to unbalance an electrical supply effected through at least two leads, or to an excess current appearing in one of these leads, comprising two sub-assemblies each comprising a transformer and rectifier and each sensitive to one of these faults and selected so as to provide respectively control signals of the same order of magnitude, and a common sub-assembly including the electret capacitor, the urging means and the switch.

10. Circuit breaker according to claim 9, wherein the assembly of the transformer, the voltage rectifying means, the electrodes, the electret, the urging means and the switch, are mounted in the same housing.

11. Circuit breaker according to claim 8, wherein said urging means are constituted by a dead center overshoot elastic mechanism, which is at least sensitive to a leakage current adapted to unbalance an electrical supply effected through at least two leads, or to an excess current appearing in one of these leads, comprising two sub-assemblies each comprising a transformer and rectifier, and each sensitive to one of these faults and selected so as to provide respectively control signals of the same order of magnitude, and a common downstream sub-assembly including the electret capacitor, the urging means and the switch.

12. Circuit breaker according to claim 8, wherein said urging means are of the magnetic type, and are at least sensitive to a leakage current adapted to unbalance an electrical supply effected through at least two leads, or to an excess current appearing in one of these leads, comprising two sub-assemblies each comprising a transformer and rectifier, and each sensitive to one of these faults and selected so as to provide respectively control signals of the same order of magnitude, and a common sub-assembly including the electret capacitor, the urging means and the switch.

13. Circuit breaker according to claim 8, wherein the assembly of the transformer, the voltage V rectifying means, the electrodes, the electret, the urging means and the switch, are mounted in the same housing.

14. Circuit breaker according to claim 13, wherein the housing is that of a socket with at least two male or female pins.

15. Circuit breaker according to claim 14, wherein the housing is a connector for a socket comprising at least two male pins and at least two female pins.

* * * * *